Figure 1:
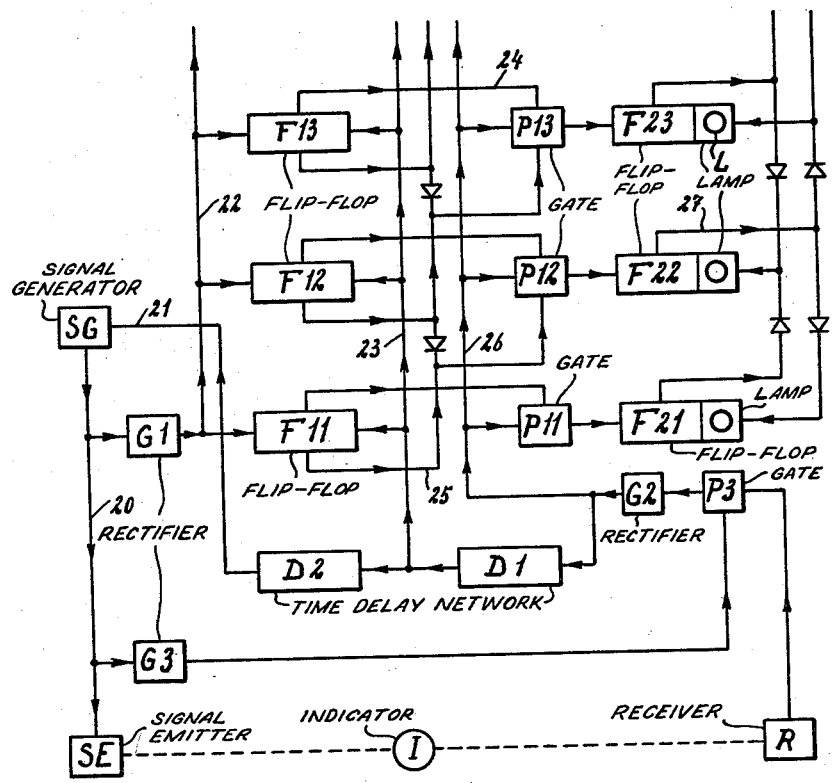

3,125,754
AIRCRAFT ALTIMETERS
Theodorus Reumerman, Zandvoortselaan 12, Zandvoort, Netherlands, and Willem H. Th. Helmig, Van Slingelandtlaan 9, Leiden, Netherlands
Filed Feb. 26, 1959, Ser. No. 795,756
4 Claims. (Cl. 343—13)

The invention relates to altimeter devices for airplanes and other aircraft, and more in particular to aircraft altimeter devices comprising means for emitting a modulated radiation towards the earth, for receiving the radiation reflected by the earth surface, and for deducing the height of the aircraft from the phase difference between the emitted and received radiations.

There are, generally speaking, two kinds of altimeters based on this general principle, to wit echo sounder altimeters and radio altimeters.

In the echo sounder altimeters, an acoustic or supersonic signal is emitted periodically, say every three seconds. Thus, the modulation pattern of the emitted radiation consists of impulses of short duration, having a repetition frequency of, say, .33 cycle/sec. At the moment of signal emission, a pointer starts to run along a scale. When the signal returns after being reflected against the earth surface, the pointer is stopped by electromagnetic means so as to indicate the height. During take off and landing operations, when current information about the height of the aircraft is required, this discontinuous operation makes it necessary to watch the scale of the altimeter continuously, or at least at regular intervals, in order to intercept the periodic height indications. In civil aircraft, the task of reading the altimeter is often allotted to one of the members of the crew, for instance to the mechanic, who informs the pilot about the height by calling the indications of the altimeter. Where no member of the crew is available for this purpose, the pilot is handicapped by the necessity of reading the altimeter at regular intervals.

Even if one succeeds in intercepting the successive height indications, the information available about the height of the aircraft is not very reliable in view of the rather large time interval between successive indications. In a time interval of the order of three seconds, the height of an aircraft may alter considerably, in particular during take off and landing operations. An interval of this order is necessary, however, to enable a reliable operation at larger heights.

In radio altimeters, the emitted radiation is a modulated high frequency signal. In some altimeters of this kind, high frequency oscillations generated by a suitable oscillator are frequency modulated by means of a modulating signal having a saw tooth wave form, so that a frequency difference exists between the emitted and received signals which is proportional to the height of the aircraft. In other radio altimeters, the high frequency oscillations are amplitude modulated by means of a modulating signal consisting of periodic impulses of short duration, and the height of the aircraft is deduced from the phase difference between the emitted and received impulses. Thus, the modulation pattern is either a saw tooth wave, or a train of short impulses, and has a constant repetition frequency. This repetition frequency may not be too high, as it is essential for a reliable indication at large heights that the emitted and received signals fall within one period of the modulation pattern. At low heights, the indication of a radio altimeter is unreliable because of the extremely small phase difference between the emitted and received signals.

Thus, it will be seen that echo sounder altimeters and radio altimeters have a common drawback, i.e. that they are unreliable below a certain level.

The imperfections of the existing aircraft altimeters have frequently led to accidents. In general, these accidents are caused by the fact that the pilot is misinformed about the height of the aircraft. During take off, the pilot believes that he is at a certain level, at which an operation is to be performed, when this is actually not the case. During landing operations, the aircraft descends below a critical level at which the pilot ought to do something, without the pilot being aware of this fact. Serious accidents have also happened to parachutists due to misinformation about the height of the aircraft at the time of the jump.

It is an object of the invention to provide echo sounders and radio altimeters giving a reliable height indication at lower levels than was hitherto possible.

Another object of the invention is to provide an echo sounder altimeter giving a continuous indication.

Still another object of the invention is to provide an altimeter device comprising one or more alarm circuits warning the pilot that he is at a predetermined level.

A still further object of the invention is to provide a reliable altimeter which makes it possible to perform take off and landing operations during unfavorable weather conditions, for instance in a fog, under conditions where such operations were impossible up to now.

Further objects and advantages of the invention will appear from the following description given with reference to the accompanying drawings, wherein:

FIG. 1 is a circuit diagram of an altimeter according to the invention, based on the echo sounder principle.

Referring to FIG. 1, SG denotes a signal generator producing acoustic or supersonic signals of short duration, and connected through a line 20 with a signal emitter SE, which emits the said signals in the direction of the earth surface. If left to itself, the signal generator SG produces the said signals periodically, at intervals, of say, five seconds, but it may be caused to produce a signal at an earlier time by a trigger impuse supplied to the signal generator through a line 21. A rectified G1 is connected in parallel with the signal emitter SE and serves to rectify the emitted signal so as to produce a control voltage, which is supplied through a line 22 to a plurality of flip-flop circuits F11, F12, F13, and so on, whereby these circuits are brought from their rest or zero position to their second or operative position. The said flip-flop circuits are designed in such manner that they return from said second to said first position after a time interval which is different for each of the circuits. This time interval is the smallest for circuit F11, somewhat larger for circuit F12, larger again for circuit F13, and so on. In addition, the flip-flop circuits may be returned from their second to their first position by an impulse supplied through line 23. A plurality of gates P11, P12, P13, and so on, are each associated with one of the said flip-flop circuits, and connected therewith through a line 24, which supplies a positive voltage to the gate when the associated flip-flop circuit is in its second position. This positive voltage tends to open the gate. However, if any of the flip-flop circuits is in its second position, it also supplies a negative voltage through a line 25 to all succeeding gates, and this negative voltage cancels the effect of the said positive voltage. Thus, only one gate may be open at any time. Immediately after emission of a signal, gate P11 is open. As soon as circuit F11 returns to its first position, the negative voltage is taken away from gate P12, so that the same is opened, and so on.

A receiver R serves to intercept the signals reflected by the earth surface. The received signals are rectified by a rectifier G2, so as to produce a control voltage which is supplied through a line 26 to the gates P11, P12, P13, etc. If, for instance, the reflected signal returns after circuit F11 has returned to its first position, but before circuit F12 has returned to its first position, the control voltage generated by rectifier G2 finds gate P12 open, and is supplied to a secondary flip-flop circuit F22 associated with the said gate. Secondary flip-flop circuit F22 is thereby changed over from its first or zero position to its second or operative position. As appears from the drawing, each of the gates has a secondary flip-flop circuit F21, F22, F23, and so on, associated therewith. Each of these circuits comprises a lamp L which is ignited when the circuit is in its second or operative position. Thus, in the present case, the reflected signal will ignite the lamp of flip-flop circuit F22. As soon as any of the secondary flip-flop circuits is brought into its second position, a voltage is supplied through a line 27 to the two adjacent secondary flip-flop circuits, whereby the latter are returned to their first position if they should happen to be in their second position. Thus, only one of the secondary flip-flop circuits can be in its second position, and only one of the lamps L can be ignited at any time. Together, the lamps L form a scale, indicating the height of the aircraft. If any of the lamps is burning, this designates that the aircraft is within a certain height range. Thus, the height of the aircraft is indicated continuously, i.e. it may be read at any desired time, in contradistinction to the known echo sounder altimeters, wherein the indication is discontinuous.

The control voltage generated by rectifier G2 is also supplied to a pair of series connected time delay networks D1, D2. After a time interval sufficient to permit the change over of any of the secondary flip-flop circuits from its first to its second position, the said control voltage reaches the output terminals of network D1, and is supplied to line 23 to return any of the primary flip-flop circuits F11, F12, F13, . . . that are still in the second position to their first position. After a time interval sufficient for this change over of the primary flip-flop circuits, the control voltage reaches the output terminals of network D2, and is supplied through line 21 to the signal generator SG, whereby the same is triggered to emit a new impulse. Thus, it will be seen that the emission of an impulse is always immediately caused by the reception of the reflected previous impulse. Thus, the repetition frequency of the emitted impulses is higher according as the aircraft is nearer to the earth surface.

A gate P3 is connected between receiver R and rectifier G2 and serves to suppress the signals directly transmitted from the emitter SE to the receiver R. For this purpose, gate P3 is closed by rectifier G3 during the emission of a signal.

If desired, the signal emitter SE and the receiver R may be connected, as indicated by dotted lines, with an indicator I of the usual type, i.e. with a pointer started by the emitted signal and stopped upon reception of the reflected signal.

Although the invention has been described hereinbefore by reference to a specific embodiment thereof, it is to be understood that many alterations and modifications are possible within the scope of the invention as set forth in the appended claims. In particular, the lamps shown in FIG. 1 of the drawings may be replaced by any other kind of indicating or actuating means, including means for performing auxiliary operations, such as lowering the landing gear, or switching on a "no smoking" sign, and means acting on the steering mechanism of the aircraft.

We claim:

1. A recurrent pulse reflection distance finding system comprising a recurrent pulse transmitter, a pulse receiver, a plurality of primary voltage generator means operative responsively to pulse transmission to supply output voltages of predetermined different time durations, a plurality of gate means each responsive to the output voltage of one of the said voltage generator means to transmit a signal applied thereto, means supplying each gate means with the received pulse output from the pulse receiver for controlled transmission therethrough, a plurality of secondary voltage generator means each connected to receive the receiver pulse output through one of the gate means and operative to generate a voltage of predetermined duration in response thereto, and a plurality of visual indicating means each responsive to operation of one of said secondary voltage generator means.

2. An aircraft altimeter device, comprising a signal generator generating intermittent signals, a signal emitter connected with said signal generator for emitting the said intermittent signals towards the earth, a receiver for the signals reflected against the earth surface, a receiving rectifier connected with said receiver, a plurality of primary flip-flop circuits, adapted to be brought from a rest position into an operative position and to return automatically to the rest position after a certain time interval which is different for each of the said circuits, a rectifier connected with said signal generator so as to produce at each signal emission a voltage for changing over the said primary flip-flop circuits from their rest position to their operative position, a plurality of gates connected with the output of said receiving rectifier and each associated with one of the said primary flip-flop circuits, a connection between each of the said primary flip-flop circuits and the associated gate whereby a positive voltage is supplied to the gate when the flip-flop circuit is in its operative positon so as to open the gate, connections between each of the said primary flip-flop circuits and the gates associated with all primary flip-flop circuits for which the said time interval is larger whereby a negative voltage cancelling the said positive voltage is supplied to the said gates when the flip-flop circuit in question is in its operative position, a plurality of secondary flip-flop circuits each connected with one of said gates so as to receive the output voltage of said receiving rectifier when the gate is open, whereby the secondary flip-flop circuit is brought from a rest position into an operative position, a plurality of indicators each associated with one of the said secondary flip-flop circuits and each indicating whether the associated circuit is in its operative position, and a delay network connected between said receiving rectifier and said signal generator, whereby the output signal of said receiving rectifier is supplied with a suitable time delay to said signal generator to trigger the same for generation of a new signal.

3. An aircraft altimeter device as claimed in claim 2, further comprising connections between each of the said secondary flip-flop circuits and the two adjacent secondary flip-flop circuits whereby a voltage is supplied to the said adjacent circuits when the first-mentioned circuit is brought into its operative position so as to return the said adjacent circuits to their rest position if necessary.

4. An aircraft altimeter device as claimed in claim 2, further comprising a connection between an intermediate point on said delay network and the said primary flip-flop circuits, whereby the voltage generated by said receiving rectifier returns the said primary flip-flop circuits to their rest position after a suitable time delay.

References Cited in the file of this patent

UNITED STATES PATENTS

| | | |
|---|---|---|
| 1,889,614 | Rice | Nov. 29, 1932 |
| 2,333,688 | Shepard | Nov. 9, 1943 |
| 2,400,309 | Kock | May 14, 1946 |
| 2,537,574 | Crosby | Jan. 9, 1951 |
| 2,537,593 | Landon et al. | Jan. 9, 1951 |
| 2,890,437 | Dudley et al. | June 9, 1959 |
| 2,921,302 | Cartwright | Jan. 12, 1960 |